(12) United States Patent
Yang et al.

(10) Patent No.: US 7,799,406 B2
(45) Date of Patent: *Sep. 21, 2010

(54) METHOD AND USE OF STRETCHABLE NONREINFORCED TPO BUILDING MATERIALS

(75) Inventors: Li-Ying Yang, Whippany, NJ (US); Edward Nebesnak, Mine Hill, NJ (US)

(73) Assignee: Building Material Investment Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,269

(22) Filed: Jan. 25, 2010

(65) Prior Publication Data

US 2010/0197844 A1 Aug. 5, 2010

Related U.S. Application Data

(63) Continuation of application No. 11/627,645, filed on Jan. 26, 2007, now Pat. No. 7,666,491.

(51) Int. Cl.
| | |
|---|---|
| G11B 5/64 | (2006.01) |
| B32B 3/00 | (2006.01) |
| C08F 8/00 | (2006.01) |
| C08L 9/00 | (2006.01) |
| C08L 23/00 | (2006.01) |
| C08L 23/04 | (2006.01) |
| C09D 17/00 | (2006.01) |
| C08K 3/18 | (2006.01) |
| C08K 3/22 | (2006.01) |
| C08K 5/00 | (2006.01) |

(52) U.S. Cl. .................. 428/156; 428/141; 525/191; 525/232; 525/240; 524/425; 524/430; 524/515

(58) Field of Classification Search .................. 428/156, 428/141, 167; 525/191, 232, 240; 524/425, 524/430, 515
See application file for complete search history.

(56) References Cited

U.S. PATENT DOCUMENTS

| | | | |
|---|---|---|---|
| 5,286,798 | A | 2/1994 | Davis et al. |
| 5,370,755 | A | 12/1994 | Davis et al. |
| 5,389,715 | A | 2/1995 | Davis et al. |
| 6,207,754 | B1 | 3/2001 | Yu |
| 6,615,892 | B2 | 9/2003 | Hubbard et al. |
| 6,864,195 | B2 | 3/2005 | Peng |
| 6,927,258 | B2 | 8/2005 | Datta et al. |
| 7,666,491 | B2 | 2/2010 | Yang et al. |
| 2002/0114924 | A1 | 8/2002 | Albert |
| 2003/0050402 | A1 | 3/2003 | Marchand et al. |
| 2003/0050411 | A1 | 3/2003 | Gatnor et al. |
| 2003/0181597 | A1 | 9/2003 | Glogovsky et al. |
| 2004/0204547 | A1 | 10/2004 | Dharmarajan et al. |
| 2005/0107529 | A1 | 5/2005 | Datta et al. |
| 2005/0107534 | A1 | 5/2005 | Datta et al. |
| 2005/0210802 | A1 | 9/2005 | Yang et al. |
| 2005/0282449 | A1 | 12/2005 | Mehta et al. |
| 2006/0046084 | A1 | 3/2006 | Yang et al. |
| 2007/0087166 | A1 | 4/2007 | Lee et al. |

FOREIGN PATENT DOCUMENTS

| | | |
|---|---|---|
| WO | WO 00/069965 | 11/2000 |
| WO | WO 03/033585 | 4/2003 |
| WO | WO 2006/023117 | 2/2006 |

OTHER PUBLICATIONS

N. Dharmarajan et al., "Soft TPO Formulations Containing Specialty Propylene Elastomers", ANTEC 2005, pp. 1252-1256.
News Release, "Dow unveils VERSIFY Plastomers and Elastomers—new technology generates unique performance combinations", Dow Europe GmbH, Feb. 12, 2004.
Sexton, D., et al., "Developmental performance plastomers and elastomers: Resin technology, performance and applications", International Conference on Polyolefins 2004, Society of Plastics Engineers.
Product Data Sheet, VISTAMAXX™6100 Vistamaxx Specialty Elastomers, Exxon Mobil Corporation, Feb. 17, 2006.
Product Data Sheet, DE 2300.10 Developmental Elastomer, The Dow Chemical Company, Nov. 2007.
Product Data Sheet, DE 2400.00 Developmental Performance Elastomer, The Dow Chemical Company, Jun. 2001.

(Continued)

Primary Examiner—David R Sample
Assistant Examiner—Catherine Simone
(74) Attorney, Agent, or Firm—William J. Davis; Greenberg Traurig, LLP

(57) ABSTRACT

In one embodiment, the present invention relates to a membrane for use as an outdoor building material comprising a non-reinforced TPO outdoor building material membrane composed of a single ply embossed thermoplastic polyolefin polymer wherein the embossed membrane has a stretchability in the range of about 5 lbf to about 30 lbf, as tested with about a 30-mil thickness sample under the "stretchability test." In yet another embodiment, the present invention relates to a method of applying a non-reinforced TPO outdoor building material membrane to a motor home roof comprising the step of: a) applying a non-reinforced TPO membrane to RV roof wood deck, wherein the membrane is composed of a thermoplastic polyolefin polymer with at least one of the following ingredients of a fire retardant, a UV and thermal stabilizers, a titanium dioxide and a calcium carbonate and wherein the membrane has a stretchability in the range of about 5 lbf to about 30 lbf, as tested with about a 30-mil thickness sample under the "stretchability test" and wherein the roofing membrane has a whiteness of at least an L* value of 90 as measured by the Whiteness Test; and b) adhering the non-reinforced TPO membrane to the wood deck via factory or field applied adhesive with a minimum 4 PLI of peel strength under the ASTM D413 peel test.

9 Claims, No Drawings

OTHER PUBLICATIONS

Written Opinion of the International Searching Authority, dated Jul. 17, 2006, received in International (PCT) Patent Application No. PCT/US05/23852, dated Jul. 5, 2005.
International Search Report, dated Jul. 17, 2006, received in International (PCT) Patent Application No. PCT/US05/23852, dated Jul. 5, 2005.
Office Action, dated Jun. 12, 2006, received in U.S. Appl. No. 10/925,097, filed on Aug. 24, 2004.
Amendment and Response of Sep. 27, 2006 to Office Action, dated Jun. 12, 2006, received in U.S. Appl. No. 10/925,097, filed on Aug. 24, 2004.
Office Action, dated Dec. 11, 2006, received in U.S. Appl. No. 10/925,097, filed on Aug. 24, 2004.
Amendment and Response of Jun. 7, 2007 to Office Action, dated Dec. 11, 2006, received in U.S. Appl. No. 10/925,097, filed on Aug. 24, 2004.
Office Action, dated Jul. 6, 2007, received in U.S. Appl. No. 10/925,097, filed on Aug. 24, 2004.
Amendment and Response of Dec. 4, 2007 to Office Action, dated Jul. 7, 2007, received in U.S. Appl. No. 10/925,097, filed on Aug. 24, 2004.
Office Action, dated Dec. 27, 2007, received in U.S. Appl. No. 10/925,097, filed on Aug. 24, 2004.
Amendment and Response of Apr. 28, 2008 to Office Action, dated Dec. 27, 2007, received in U.S. Appl. No. 10/925,097, filed on Aug. 24, 2004.
Office Action, dated May 9, 2008, received in U.S. Appl. No. 10/925,097, filed on Aug. 24, 2004.
Amendment and Response of Oct. 9, 2008 to Office Action, dated May 9, 2008, received in U.S. Appl. No. 10/925,097, filed on Aug. 24, 2004.
Office Action, dated Jan. 29, 2009, received in U.S. Appl. No. 10/925,097, filed on Aug. 24, 2004.
Amendment and Response to Final Office Action, dated Jun. 29, 2009, filed in response to Office Action dated Jan. 29, 2009 in U.S. Appl. No. 10/925,097.
Office Action dated Sep. 1, 2009, received in U.S. Appl. No. 10/925,097, filed on Aug. 24, 2004.
Amendment and Response of Dec. 1, 2009 to Office Action, dated Sep. 1, 2009, received in U.S. Appl. No. 10/925,097, filed on Aug. 24, 2004.
Office Action, dated Mar. 16, 2010, received in U.S. Appl. No. 10/925,097, filed on Aug. 24, 2004.
Amendment and Response of May 17, 2010 to Office Action, dated Mar. 16, 2010, received in U.S. Appl. No. 10/925,097, filed on Aug. 24, 2004.
Office Action, dated Feb. 11, 2008, received in U.S. Appl. No. 11/627,645, filed on Jan. 26, 2007.
Amendment and Response of Apr. 11, 2008 to Office Action, dated Feb. 11, 2008, received in U.S. Appl. No. 11/627,645, filed on Jan. 26, 2007.
Office Action, dated Jul. 9, 2008, received in U.S. Appl. No. 11/627,645, filed on Jan. 26, 2007.
Amendment and Response of Nov. 12, 2008 to Office Action, dated Jul. 9, 2008, received in U.S. Appl. No. 11/627,645, filed on Jan. 26, 2007.
Office Action, dated Feb. 20, 2009, received in U.S. Appl. No. 11/627,645, filed on Jan. 26, 2007.
Amendment and Response of May 11, 2009 to Office Action, dated Feb. 20, 2009, received in U.S. Appl. No. 11/627,645, filed on Jan. 26, 2007.
Office Action, dated Jul. 15, 2009, received in U.S. Appl. No. 11/627,645, filed on Jan. 26, 2007.
Amendment and Response of Sep. 15, 2009 to Office Action, dated Jul. 15, 2009, received in U.S. Appl. No. 11/627,645, filed on Jan. 26, 2007.
An Advisory Action mailed May 25, 2010, in connection with U.S. Appl. No. 10/925,097.

METHOD AND USE OF STRETCHABLE NONREINFORCED TPO BUILDING MATERIALS

CROSS-REFERENCE TO RELATED APPLICATIONS

The present application is a continuation of U.S. patent application Ser. No. 11/627,645, now U.S. Pat. No. 7,666,491 filed on Jan. 26, 2007, the disclosure of which is incorporated by reference herein in its entirety.

FIELD OF THE INVENTION

In one embodiment, the present invention relates to outdoor building material (e.g. building materials roofing membrane, signage, awnings, wall coverage, and cover tapes) and in one specific embodiment, to a non-reinforced elastomeric TPO outdoor building material membrane that exhibits substantially equivalent stretchable properties as ethylene propylene diene monomer ("EPDM").

BACKGROUND OF THE INVENTION

A typical low-slope roofing system consists of three components: a structural deck, a thermal insulation barrier and a waterproofing membrane, which consists of reinforcing fibers or fabric sandwiched between two sheets of flexible matrix. The matrix material is either asphalt- or polymer-based. There are essentially two classes of polymer-based roofing membranes: thermosets and thermoplastics. Thermoplastics reversibly soften when heated, whereas thermosets do not. Thermoplastics encompass thermoplastic polyolefins (TPOs).

A typical TPO is a melt blend or reactor blend of a polyolefin plastic, typically a polypropylene polymer, with an olefin copolymer elastomer (OCE), typically an ethylene-propylene rubber (EPR) or an ethylene-propylene-diene rubber (EPDR). Conventionally, a suitable roofing membrane exhibits the following properties: sufficiently strong enough to withstand stresses and to accommodate deck movement. Examples of commercially available TPO membranes include SURE WELD™ (Carlisle Inc.), GENFLEX™ (Omnova Solutions, Inc), ULTRAPLY™ (Firestone Building Products) and EVERGUARD TPO™ (GAF). Typically, these membranes are fixed over a roof having insulation material placed thereon.

Problems with these membranes are that they have a rigid feel, tend to hold their shape, and do not relax quickly. The stiffness characteristics affect the membrane installation process. As such, they are generally not pliable to conform to the shape of detailing profiles (e.g. around HVAC and skyline windows) where detailing works are required for waterproofing.

Conventional reinforced TPO membranes are manufactured with a reinforcing scrim encapsulated between two layers of TPO compounds. In one example, the TPO sheet is reinforced with a polyester fleece reinforcement layer. Two TPO membranes are typically sealed by hot air heat-welding or seamed together using an adhesive. The hot air melts the polymer at the seam and the two strips of membrane become fused and bonded with gentle pressure. Another desirable characteristic of TPO membranes is the high heat seal strength. There are two sets of forces constantly working to damage the roofing seams. Wind uplift attempts to peel the seams apart. Building movement attempts to pull the seams apart. High seal strength provides high wind resistance for the roof and long life waterproofing. A conventional Ziegler-Natta catalyzed TPO has a bimodal or broad molecular weight distribution. The low molecular weight oligomers migrate to membrane surface preventing welding or deteriorating the heat seam strength. A TPO with a narrow molecular weight distribution eliminates surface blooming and provides high heat seal peel strength.

In contrast, ethylene propylene diene monomer (or terpolymer which is simply a product consisting of three distinct monomers) ("EPDM") has been in use on roofs in the USA since the 1960's and is one of the most common types of low-slope roofing materials. This is because it is relatively inexpensive, simple to install, and fairly clean to work with when compared to conventional built-up roofs. In addition, due to its superior stretchability to conform to roof corners and angle changes, Nonreinforced EPDM is widely used as a roof covering for most motor homes and recreational vehicles. In one specific application, $TiO_2$ is added to produce a white EPDM. However, compared to white TPO, white EPDM typically does not stand up to the weather because it caulks, loses its color, shrinks and does not lay flat.

EPDM roofs are typically single-ply membranes either a single nonreinforced EPDM layer or a sandwich of top, bottom TPO layers and a reinforcement within. EPDM is classified as a thermoset material which means it is either fully-cured prior to being installed or that it cures during natural weathering after installation. EPDM is a rubber material whose principal components consist of the compounds ethylene and propylene. A flexible rubber matrix forms when a small amount of diene is added to the mix. EPDM is available reinforced or unreinforced with both commonly used; its also available in either a cured (vulcanized) or uncured (non-vulcanized) state. Vulcanized EPDM is the most common with non-vulcanized often used for flashing purposes.

SUMMARY OF THE INVENTION

In one embodiment; the present invention is a membrane for use as an outdoor building material comprising a non-reinforced TPO outdoor building material membrane composed of a single ply embossed thermoplastic polyolefin polymer wherein the embossed membrane exhibits substantially equivalent stretchable properties as ethylene propylene diene monomer ("EPDM").

TPO elastomer of the present invention is a thermoplastic polyolefin that is a polypropylene based copolymer with less than about 25% (on a weight basis) of polyethylene composition. Conventional TPO elastomer is a polyethylene based copolymer with more than 50% (on a weight basis) of polyethylene such as metallocene polyethylene (Dow Engage®, Exxonmobile Exact®), and ethylene propylene rubber with 0% unsaturation (EPM).

In one embodiment, the present invention relates to an outdoor building material composed of a non-reinforced TPO membrane wherein the embossed membrane has a stretchability in the range of about 5 lbf to about 30 lbf, as tested with about a 30-mil thickness sample under the "stretchability test." In another embodiment, the non-reinforced TPO membrane has a stretchability in the range of about 10 lbf to about 20 lbf, as tested with about a 30-mil thickness sample under the "stretchability test." In yet another embodiment, the embossed thermoplastic polyolefin polymer is a polypropylene base copolymer. In a further embodiment, the embossed thermoplastic has a whiteness of at least an L* value of 90 as measured by the Whiteness Test, disclosed herein.

In another embodiment, the present invention relates to a method of producing a non-reinforced TPO membrane comprising the steps of: mixing a thermoplastic polyolefin polymer with at least one of the following ingredients of a fire retardant, a UV and thermal stabilizers, a titanium dioxide and a calcium carbonate; extruding through a sheet die to a thicknesses of about 15 to about 50 mils; and embossing the extruded material to a thickness of about 3 to about 15 mils to form a single ply roofing membrane, wherein the embossed single ply roofing membrane has a stretchability in the range of about 5 lbf to about 25 lbf, as tested with about a 30-mil thickness sample under the "stretchability test." In yet another embodiment, the thermoplastic polyolefin polymer is mixed with at least the UV and thermal stabilizers, titanium dioxide and calcium carbonate. In a further embodiment, the embossed thermoplastic polyolefin polymer is a polypropylene base copolymer. In yet another embodiment, the embossed thermoplastic has a whiteness of at least an L* value of 90 as measured by the Whiteness Test.

In yet another embodiment, the present invention relates to using the non-reinforced TPO membrane of the present invention to an RV roof wood deck, comprising the steps of: applying an adhesive to the wood deck; pulling the non-reinforced TPO membrane over the entire roof in one continuous piece, wherein the membrane is composed of a thermoplastic polyolefin polymer with at least one of the following ingredients of a fire retardant, a UV and thermal stabilizers, a titanium dioxide and a calcium carbonate and wherein the membrane has a stretchability in the range of about 5 lbf to about 30 lbf, as tested with about a 30-mil thickness sample under the "stretchability test" and wherein the roofing membrane has a whiteness of at least an L* value of 90 as measured by the Whiteness Test; cutting the membrane in an X pattern for at least openings on a top of the RV roof; brooming the membrane; and securing edges of the membrane.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment, the present invention relates to a non-reinforced TPO membrane made by a polypropylene based elastomer (PBE) that exhibits substantially equivalent stretchable properties as ethylene propylene diene monomer ("EPDM") but, in contrast to EPDM, provides superior heat weldability, solar reflectivity, color fastness and substantially no caulking. In one embodiment, the "stretchability" properties of the present invention is in the range of about 5 lbf to about 25 lbf, more particularly, from about 10 lbf to about 15 lbf as tested with about a 30-mil thickness sample under ASTM D751 breaking test procedure as detailed below for the "stretchability test."

In addition, in yet another embodiment, the present invention relates to non-reinforced TPO membrane made by a polypropylene base elastomer (PBE) that exhibits a superior whiteness—whiteness of at least an L* value of 90 as measured by the Whiteness Test.

In one embodiment, the PBE polymer composition of the present invention is propylene/alpha-olefin copolymers with semi-crystalline isotactic propylene segments. In one specific embodiment, the PBE for use in the present invention have a comonomer range of between about 5-15%, preferably about—15%. The comonomers are alpha-olefins. In addition, in another example, the PBE polymers have a narrow molecular weight distribution of 2-3. The molecular weight distribution is indicated by $M_w/M_n$ (also referred to as polydispersity index or "PDI" or "MWD").

In yet another embodiment, suitable TPO for use in the present invention is Dow "Versify" (e.g. DE2300 and/or DE 2400).

For purposes of the present invention, the term "non-reinforced TPO" membrane means a single layer of TPO without a reinforced scrim or mat on the back of the membrane. For purpose of the present invention, the term "heat-sealable" means a material that is capable of being joined by a heating method so as to create a molecular bonding at joints.

In yet another embodiment, suitable TPO for use in the present invention is ExxonMobile "Vistamaxx" (e.g. 1100 and/or 6100). One method of producing such a TPO is disclosed in U.S. Pat. No. 6,927,258, which is incorporated by reference herein. For example, such a TPO is produced by blending a "first polymer component" ("FPC") which is a predominately crystalline stereoregular polypropylene with a "second polymer component" ("SPC") which is a crystallizable copolymer of a C2, C4-C20 alpha.-olefin and propylene. Optional components of the blend are SPC2, a crystallizable copolymer of a C.sub.2, C.sub.4-C.sub.20.alpha.-olefin (preferably ethylene), and process oil. Other optional components are fillers, colorants, antioxidants, nucleators and flow improvers.

The FPC melts higher than 110.degree. C. and has a heat of fusion of at least 75 J/g, as determined by DSC analysis. The crystalline polypropylene can be either homopolymer or copolymers with other alpha olefins. The SPC and the SPC2, if used, have stereoregular propylene sequences long enough to crystallize. The SPC has a melting point of less than 105.degree. C. and has a heat of fusion of less than 75 J/g. The SPC2 has a melting point of less than 115.degree. C. and has a heat of fusion of less than 75 J/g. One embodiment is blending isotactic polypropylene (FPC) with ethylene propylene copolymers (SPC) having about 4 wt. % to about 35 wt. % ethylene (to ensure high compatibility with the FPC). Both the FPC and the SPC have isotactic propylene sequences long enough to crystallize. The ratio of the FPC to the SPC of the blend composition may vary in the range of 1:99 to 95:5 by weight and, in particular, in the range 2:98 to 70:30 by weight.

In one embodiment, the propylene based elastomers of the present invention have a glass transition temperature ($T_g$) range of about −25 to −35.degree. C. The $T_g$ as used herein is the temperature above which a polymer becomes soft and pliable, and below which it becomes hard and glassy. The propylene based plastomers and elastomers of the present invention have a MFR range measured at 230° C. of between about 0.5 to about 25, preferably about 2, and a melt temperature range of about 50 to 120° C.

In one embodiment, the propylene based elastomers of the present invention have a preferred shore A hardness range of about 60 to about 90. However, it is understood that the shore A hardness range can be below 60

In one embodiment, the propylene based elastomers of the present invention have a flexural modulus range of about 500 to about 6000 Psi, preferably about 1500-5000 Psi.

In yet another embodiment, the TPO membrane of the present invention includes one or more of the following advantages over standard EPDM including the ability to stand up to the weather and thus, not substantially caulk, lose its color, shrink and/or lay flat.

In one embodiment, the TPO membranes of the present invention have a thicknesses of about 15 to about 50 mils, and more particularly from about 25 to about 40 mils.

Suitable ingredients in addition to polymers in the non-reinforced TPO membrane include, but are not limited to: fillers, color pigments, fire retardants, antioxidants, UV and thermal stabilizers and/or processing aids. Suitable ranges of the above ingredients include, but are not limited 100 parts of highly stretchable polypropylene based elastomer, 0-80 parts of fire retardant, 0-5 parts UV and thermal stabilizers, 5-10 parts titanium dioxide and 0-80 parts calcium carbonate.

In yet another embodiment, the TPO membranes of the present invention may be any color such as white, grey, or beige. It may also have predetermined printed or embossed designs on its top surface.

In another embodiment, suitable methods of producing the TPO polymers of the present invention include, but are not limited to, precompounding or by in-situ compounding using polymer-manufacturing processes such as Banbury mixing or twin screw extrusion. After further mixing with other additives, these TPO polymers are then formed into roofing materials.

In another embodiment, the building materials of the present invention can be applied for outdoor weathering applications such as signage, awnings, wall coverage, roofing accessories, detailing, flashing membranes, T-joint patches, repair and cover tapes.

In yet another embodiment, the roofing membrane of the present invention may be fixed over the base roofing by any means known in the art such as via factory or field applied butyl adhesive, water and solvent based adhesive material, ballasted material, spot bonding, or mechanical fastening.

The present invention is explained in greater detail by reference to the following illustrative examples, but the present invention should not be construed as limited thereto.

EXAMPLES

The following illustrative examples employ the "stretchability test":
1. Cut TPO samples (6" by 4") to test for breaking strength according to Breaking Strength Procedure A-Grab Test Method under ASTM D751-98.
2. Calibrate the Load Cell
3. Place the specimen symmetrically between two clamps of an Instron machine with the longer dimension parallel to and the shorter dimension at right angles to the direction of application of the force. The distance between two clamps on TPO membrane is 3 inches.
4. Start the Instron machine which shall be adjusted so that the pulling clamp has a uniform speed of 12±0.5 inch/min.
5. Record the force (in pounds-force) to stretch the TPO membrane for 1" (i.e. at 4 inch of the distance between two clamps).
6 The stretch ability is reported by the average of five individual test results in procedure 5.

The following illustrative examples employ the "whiteness measurement":
1. Configure your software to read using the desired color scale, illuminant, and observer—C.I.E. (Commission International d'Eclairage) color system at D65/10° of illuminant/Observer conditions.
2. Standardize the instrument in Reflectance—Specular Included mode for the largest area of view possible for which the sample can completely cover the hole in the port plate (preferably LAV). First standardize on the light trap, then the white tile.
3. Center the sample to be measured over the reflectance port and hold it in place using the sample clamp. Make sure that the area of the sample to be measured faces the port and completely covers the port.
4. Take a single color reading of the sample. Rotate the sample 90° and read it at least once more. Average the multiple color readings for a single color measurement representing its color. Averaging multiple readings with rotation between readings minimizes measurement variation associated with directionality.
5. Record the average L* color values as the whiteness value.

Example

Conventional Reinforced TPO

A standard single ply RV thermoplastic polyolefin (TPO) white roofing membranes was made of 100 parts of reaction grade polypropylene copolymers CA10A from Basell Polyolefins, and other ingredients, such as 0-80 parts of fire retardant, 0-5 parts UV and thermal stabilizers, 5-10 parts titanium dioxide and 0-80 parts calcium carbonate. The ingredients were mixed in an extruder at 200° C. and extruded through a sheet die to a thickness of about 15-50 mils. A reinforcement polyester fleece fabric was inserted on bottom sheets, and the two layers were pressed and TPO sheet was embossed into a 30-100 mil fleece back single ply membrane. The standard membrane then was tested for the stretch ability and other properties. Due to the reinforcement backing, the membrane had a very poor stretchability—70 under the "stretchability test as illustrated in Table 1.

Example

Conventional Non-Reinforced TPO

A standard single ply RV thermoplastic polyolefin (TPO) white roofing membranes was made of 100 parts of reaction grade polypropylene copolymers Basell Polyolefins, and other ingredients, such as 0-80 parts of fire retardant, 0-5 parts UV and thermal stabilizers, 5-10 parts titanium dioxide and 0-80 parts calcium carbonate. The ingredients were mixed in an extruder at 200° C. and extruded through a sheet die to a thickness of about 15-50 mils. The standard membrane then was tested for the stretch ability and other properties. As illustrated in Table 1, the membrane had a poor stretchability—52 under the "stretchability test.

Example

Conventional PE Elastomer 100 parts of Engage 8200 of metallocence polyethylene-octene elastomer made by Dow Chemicals were mixed in an extruder at about 180° C. with the same ingredients as described in the Standard Example above. Then, the mixture was extruded through a sheet die to thicknesses of about 15-50 mils. The extrusion die width was from 96" to 120". The resulting extruded sheet was embossed via an embossing roll. The embossing was about 3 to about 15 mils. The membrane was tested for stretch ability and other properties. As illustrated in Table 1, the membrane had a fair stretchability—18.5 under the "stretchability test.

Example 1-3

TPO Polymers as disclosed in Table 1 Versify propylene based elastomer made by Dow Chemicals were mixed in an extruder at about 200° C. with the same ingredients as described in the Standard Example above. Then, the mixture was extruded through a sheet die to thicknesses of about 15-50 mils. The extrusion die width was from 96" to 120". The resulting extruded sheet was embossed via an embossing roll. The embossing was about 3-15 mils. The membrane was tested for stretch ability and other properties. As illustrated in Table 1, the membrane had a superior stretchability—under the "stretchability test." In addition, the membrane exhibited a superior whiteness—whiteness of at least an L* value of 90 as measured by the Whiteness Test.

Those skilled in the art will readily observe that numerous modification and alterations of the device may be made while retaining the teachings of the invention. Accordingly, the above disclosure should be construed as limited only by the metes and bounds of the appended claims.

Example 4

100 parts of TPO polymer of Vistamaxx 6100 Polypropylene elastomer made by ExxonMobil Chemicals were mixed in an extruder at about 180° C. with the same ingredients as described in the Standard Example above. Then, the mixture was extruded through a sheet die to thicknesses of about 15-50 mils. The extrusion die width was from 96" to 120". The resulting extruded sheet was embossed via an embossing roll. The embossing was about 3 to about 15 mils. The membrane was tested for stretch ability and other properties. As illustrated in Table 1, the membrane had a superior stretchability—13 under the "stretchability test." Although the conventional PE such as metallocene PE or linear low density polyethylene has the similar flexibility as the propylene based elastomer of the present invention characterized by the flexural modulus, the compounded building materials of the present invention had shown 40-50% superior stretchability than conventional polyethylene compounds. In addition, the membrane exhibited a superior whiteness—whiteness of at least an L* value of 90 as measured by the Whiteness Test.

TABLE 1

RV Roofing Physical Property Comparison

| | ASTM | EPDM RV Nonreinforced | Conventional Single Ply TPO RV Reinforced* | Conventional Single Ply TPO RV Nonreinforced | Conventional Flexible PE Nonreinforced |
|---|---|---|---|---|---|
| Polymers | | EPDM | CA10A | CA10A | MPE |
| Flex modulus (psi) | D791 | 3400 | 12.000 | 12.000 | 1755 |
| PE Content (%) | | 60-70 | 35 | 35 | 78 |
| Hardness, shore A | D2240 | 64 | 90 | 90 | 70 |
| Thickness | D751 | 38 mils | 32 mils | 25 mils | 30-mil |
| Force required to stretch the membrane for 1" CMD (Lbf) | Modified D751 | 14 | 70 | 52 | 18.5 |
| Solar Reflectivity | E903 | 60% | 80% | 80% | 80% |
| Whitness (L*) | CIE | 86 | 95 | 95 | 95 |
| Heat weldability | D413 | NA | NA | Excellent | Excellent |

| | EX. 1 Nonreinforced | Ex. 2 Nonreinforced | Ex. 3 Invention 1 TPO Nonreinforced | Ex. 4 Invention 2 TPO Nonreinforced |
|---|---|---|---|---|
| Polymers | 100% Versify DE2300 | 20%2400/80%2300 | 100% Versify DE 2400 | Vistamaxx 6100 |
| Flex modulus (psi) | 4900 | | 1700 | 1732 |
| PE Content (%) | 12 | | 15 | 16 |
| Hardness, shore A | 61 | | 48 | 64 |
| Thickness | 30-mil | 30-mil | 30-35 mil | 30-35 mil |
| Force required to stretch the membrane or 1" CMD (Lbf) | 30 | 24 | 14 | 13 |
| Solar Reflectivity | 80% | 80% | 80% | 80% |
| Whitness (L*) | 95 | 95 | 95 | 95 |
| Heat weldability | Excellent | Excellent | Excellent | Excellent |

*25 mil standard single ply TPO sheet reinforced with polyester fleece backing

What is claimed is:

1. A single-ply roofing membrane, comprising a thermoplastic polyolefin-based mixture that includes:
   a thermoplastic polyolefin blend consisting of a first polypropylene-ethylene elastomer having a first ethylene co-polymer in an amount of 15 percent by weight of said first elastomer and a second polypropylene-ethylene elastomer having a second ethylene co-polymer in an amount of 12 percent by weight of said second elastomer, wherein the amount of said first elastomer in said blend is greater than zero parts of said blend and less than 100 parts of said blend and the balance of said blend is said second elastomer;
   titanium dioxide in an amount in the range of about 5 to about 10 parts per 100 parts of said blend; and
   calcium carbonate in an amount in the range of greater than 0 to 80 parts per 100 parts of said blend,
   wherein said roofing membrane consists of a non-reinforced single layer of said thermoplastic polyolefin-based mixture,
   wherein said roofing membrane is heat-weldable, wherein a sample of said roofing membrane having a thickness of 30 mil has a stretchability that is greater than 14 lbf and less than 30 lbf as measured by the stretchability test, and wherein said roofing membrane has a whiteness of at least an L* value of 90 as measured by the whiteness test.

2. The roofing membrane of claim 1, wherein said membrane is an extruded membrane.

3. The roofing membrane of claim 2, wherein said membrane is an embossed membrane.

4. The roofing membrane of claim 3, wherein said membrane is embossed to a depth of about 3 mil to about 15 mil.

5. The roofing membrane of claim 1, wherein said thermoplastic polyolefin-based blend includes a fire retardant.

6. The roofing membrane of claim 1, wherein said thermoplastic polyolefin-based blend includes a UV stabilizer.

7. The roofing membrane of claim 1, wherein said thermoplastic polyolefin-based blend includes a thermal stabilizer.

8. The roofing membrane of claim 1, wherein said membrane is used to cover the roof of a mobile home.

9. The roofing membrane of claim 8, wherein said roof comprises a wood deck, and said roofing membrane adheres to said wood deck via an adhesive with a minimum peel strength, of 4 PLI as measured by the ASTM D413 peel test.

* * * * *

UNITED STATES PATENT AND TRADEMARK OFFICE
CERTIFICATE OF CORRECTION

PATENT NO. : 7,799,406 B2  
APPLICATION NO. : 12/693269  
DATED : September 21, 2010  
INVENTOR(S) : Li-Ying Yang and Edward Nebesnak It is certified that error appears in the above-identified patent and that said Letters Patent is hereby corrected as shown below:

Column 4,  
Line 34, replace "110.degree.C" with -- 110°C --;  
Line 40, replace "105.degree.C" with -- 105°C --;  
Line 41, replace "115.degree.C" with -- 115°C --;  
Line 53, replace "-35.degree.C" with -- -35°C --;

Signed and Sealed this  
First Day of February, 2011

David J. Kappos  
*Director of the United States Patent and Trademark Office*